US009494108B2

(12) United States Patent
Gormley

(10) Patent No.: US 9,494,108 B2
(45) Date of Patent: Nov. 15, 2016

(54) THRUST REVERSER ACTUATOR DAMPER SYSTEM

(71) Applicant: ROHR, INC., Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 100 days.

(21) Appl. No.: 14/516,217

(22) Filed: Oct. 16, 2014

(65) Prior Publication Data

US 2016/0108853 A1    Apr. 21, 2016

(51) Int. Cl.
*F02C 1/00* (2006.01)
*F02K 1/76* (2006.01)
*F02K 1/72* (2006.01)

(52) U.S. Cl.
CPC .................. *F02K 1/763* (2013.01); *F02K 1/72* (2013.01); *F05D 2260/96* (2013.01)

(58) Field of Classification Search
CPC ............ F02K 1/763; F02K 1/64; F02K 1/56; F02K 1/72
See application file for complete search history.

(56) References Cited

U.S. PATENT DOCUMENTS

| | | | | |
|---|---|---|---|---|
| 2010/0089029 | A1* | 4/2010 | Somerfield | F02K 1/70 60/226.2 |
| 2010/0326047 | A1* | 12/2010 | Gabel | F02K 1/72 60/226.2 |
| 2014/0000238 | A1* | 1/2014 | Gonidec | F02K 1/09 60/226.2 |

* cited by examiner

*Primary Examiner* — Gerald L Sung
(74) *Attorney, Agent, or Firm* — Snell & Wilmer, L.L.P.

(57) ABSTRACT

A nacelle may comprise a thrust reverser. The thrust reverser may comprise a translating sleeve, a cascade array, and a TRAS actuator. The TRAS actuator may pass through an aperture in an aft cascade ring of the cascade array. A retainer may be coupled to the aft cascade ring. A damper may be coupled to the retainer. The damper may circumscribe the TRAS actuator. The damper may be configured to damp vibrations in the TRAS actuator. As an amplitude of vibration or deflection of the TRAS actuator increases, a reaction force applied by the damper on the TRAS actuator increases, which prevents the TRAS actuator from contacting the aft cascade ring.

14 Claims, 6 Drawing Sheets

THRUST REVERSER ACTUATOR DAMPER SYSTEM

FIELD

The disclosure generally relates to thrust reverses for aircraft engines. More particularly, the disclosure relates to thrust reverser actuation systems.

BACKGROUND

Modern aircraft may utilize one or more gas turbine engines enclosed within a nacelle. The nacelle may comprise a cascade-type thrust reverser. The thrust reverser may include a translating sleeve, a cascade array, and a thrust reverser actuation system ("TRAS") actuator. The TRAS actuator may pass through the aft cascade ring of the cascade array.

The design of the pass through the aft cascade ring is influenced by several competing factors. The TRAS actuator may benefit from a pass-through in the aft cascade ring that is as large as possible so that the TRAS actuator avoids contact with the aft cascade ring. If the actuator contacts the aft cascade ring the contact will result in side loads to the actuator which may develop into damage which may cause actuator leakage. On the other hand, the aft cascade ring is a structural component and may benefit from the smallest possible pass-through in order to maintain maximum cross-sectional area for increased structural strength.

Tolerance stack-ups are also a factor and compound the problem by requiring additional clearance between the TRAS actuator and the aft cascade ring. It may be helpful to provide a damper between the aft cascade ring which provides vibration damping under normal conditions. In addition, as nacelle loft lines continue to become more constrictive, the space constraints become narrower, and the actuator and cascades must be fit into a compact space.

Some existing systems may include large gaps between the actuator and the aft cascade ring, with relatively hard bumpers arranged between the actuator and the ring. The bumpers ensure that there is no metal-metal contact if the actuator deflects enough to contact the ring (it will contact the non-metallic bumper instead). A large gap ensures the bumper does not apply any preload to the actuator which can cause premature wear. However, the gap also results in no ability to provide a damping resistance load to damp normal vibrations of the actuator. Other existing systems may allow a small pass-through in the aft cascade ring, and provide a damper which is closely positioned relative to, or is in constant contact with the actuator. The closely positioned damper provides vibration damping during normal operation of the actuator. The mounting of the damper may be adjustable so that it does not exert a preload on the actuator, but in reality the adjustment to a zero preload position is difficult to achieve and often results in a preload anyway.

SUMMARY

A thrust reverser assembly may comprise an aft cascade ring comprising an aperture. A TRAS actuator may extend through the aperture. A retainer may be coupled to the aft cascade ring. A damper may be coupled to the retainer. The damper may be in contact with the TRAS actuator. The damper may be configured to damp vibrations of the TRAS actuator.

In various embodiments, a bumper may be located between the damper and the retainer. The bumper may comprise a first portion having a first diameter, and a second portion comprising a second diameter, wherein the second diameter is larger than the first diameter. The damper may be coupled to the second portion of the bumper. The first portion may be located within the retainer. The second portion may be located forward of the retainer. The damper may comprise a bulb seal. The damper may be configured to apply a reaction force to the TRAS actuator, such that the reaction force increases as an amplitude of deflection of the TRAS actuator increases. The damper may comprise an elastomer.

A thrust reverser assembly may comprise a cascade, a TRAS actuator, and a flexible damper. The cascade may comprise an aft cascade ring. The TRAS actuator may extend through the aft cascade ring. The flexible damper may circumscribe the TRAS actuator. The flexible damper may be configured to exert a small reaction force on the TRAS actuator in response to a small deflection of the TRAS actuator. The flexible damper may be configured to exert a large reaction force on the TRAS actuator in response to the damper bottoming out.

In various embodiments, the flexible damper may be configured to damp vibrations in the TRAS actuator. A bumper may be coupled to the flexible damper and configured to prevent the TRAS actuator from contacting the aft cascade ring. The thrust reverser assembly may comprise a retainer coupled to the aft cascade ring. The retainer may be coupled to the bumper. The flexible damper may comprise an elastomer. The bumper may comprise a first portion having a first diameter, and a second portion having a second diameter, wherein the second diameter is greater than the first diameter. The flexible damper may be coupled to the second portion. The flexible damper may be configured to exert a reaction force on the TRAS actuator which increases with an amplitude of a deflection of the TRAS actuator.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods for TRAS actuator dampers are disclosed. A nacelle may comprise a thrust reverser. The thrust reverser may comprise a translating sleeve, a cascade array, and a TRAS actuator. The TRAS actuator may pass through an aperture in the aft cascade ring of the cascade array. A retainer may be coupled to the aft cascade ring. A bumper may be coupled to the retainer. A damper may be coupled to the bumper. The damper may circumscribe the TRAS actuator. The damper may be configured to damp vibrations in the TRAS actuator. As an amplitude of vibration or deflection of the TRAS actuator increases, a reaction force applied by the damper on the TRAS actuator increases, which prevents the TRAS actuator from contacting the aft cascade ring.

Figure 1:
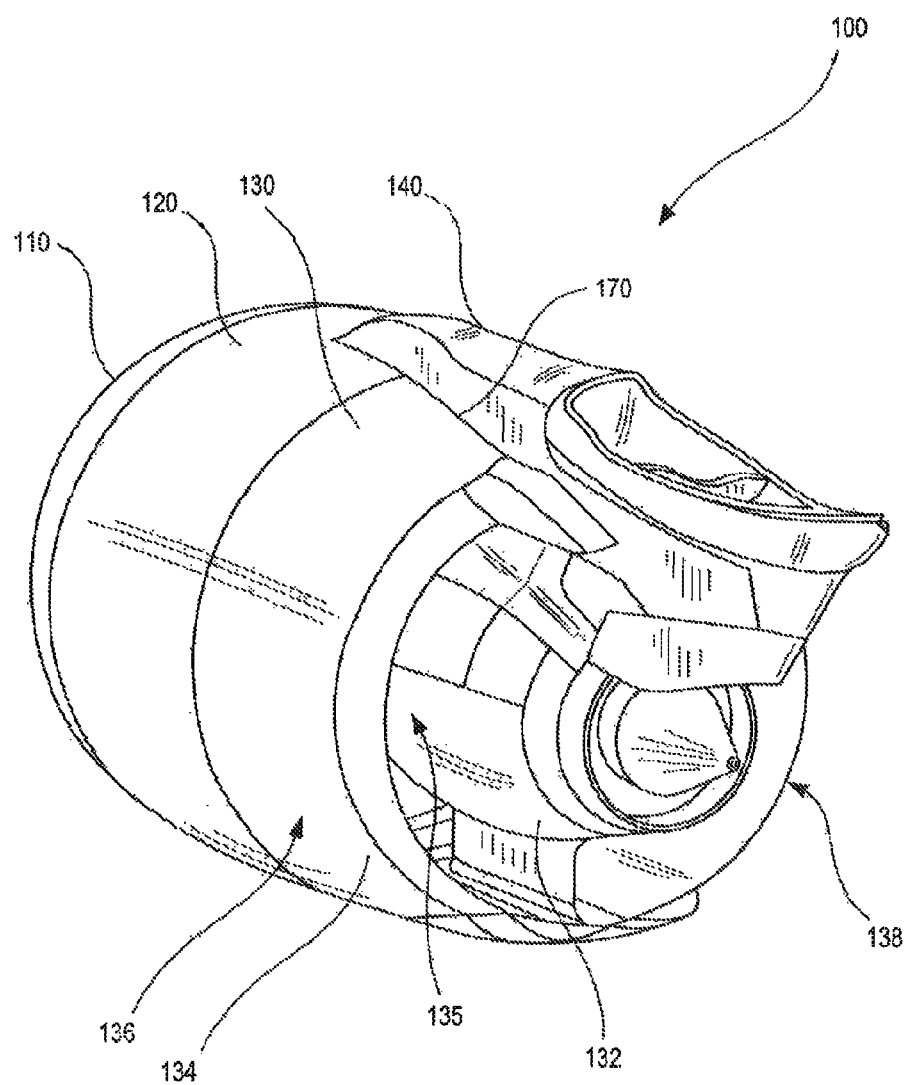
FIG. 1 illustrates a perspective view of a nacelle in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled (directly or indirectly) to a pylon 140, which may mount the nacelle 100 to an aircraft wing or aircraft body. Thrust reverser 130 may comprise an inner fixed structure ("IFS") 132 and a translating sleeve 134. Bypass air from an engine fan may flow through the outer fan duct 135 between the IFS 132 and the translating sleeve 134. The thrust reverser 130 may further be split into a left half 136 and a right half 138. The left half 136 and the right half 138 may be hinged to the pylon 140 at hinges 170. The left half 136 and the right half 138 may hinge open at hinges 170 in order to provide access to the engine.

Figure 2:
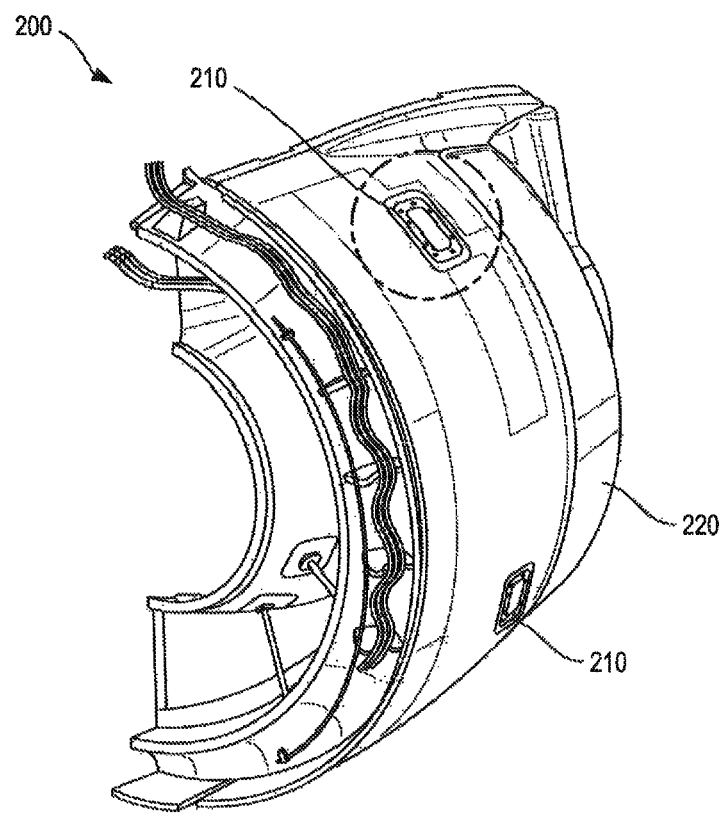
FIG. 2 illustrates a perspective view of a left half of a thrust reverser in accordance with various embodiments.

Referring to FIG. 2, a left half 200 of a thrust reverser is illustrated according to various embodiments. The left half 200 may comprise an actuator access panel 210 over each TRAS actuator. In various embodiments, there may be two or three TRAS actuators per half. The actuator access panel 210 may be opened or removed in order to access the TRAS actuators. The TRAS actuators may drive the thrust reverser translating sleeve 220 open (or closed) in order to redirect fan air flow outward and forward, thus slowing the aircraft.

Figure 3:
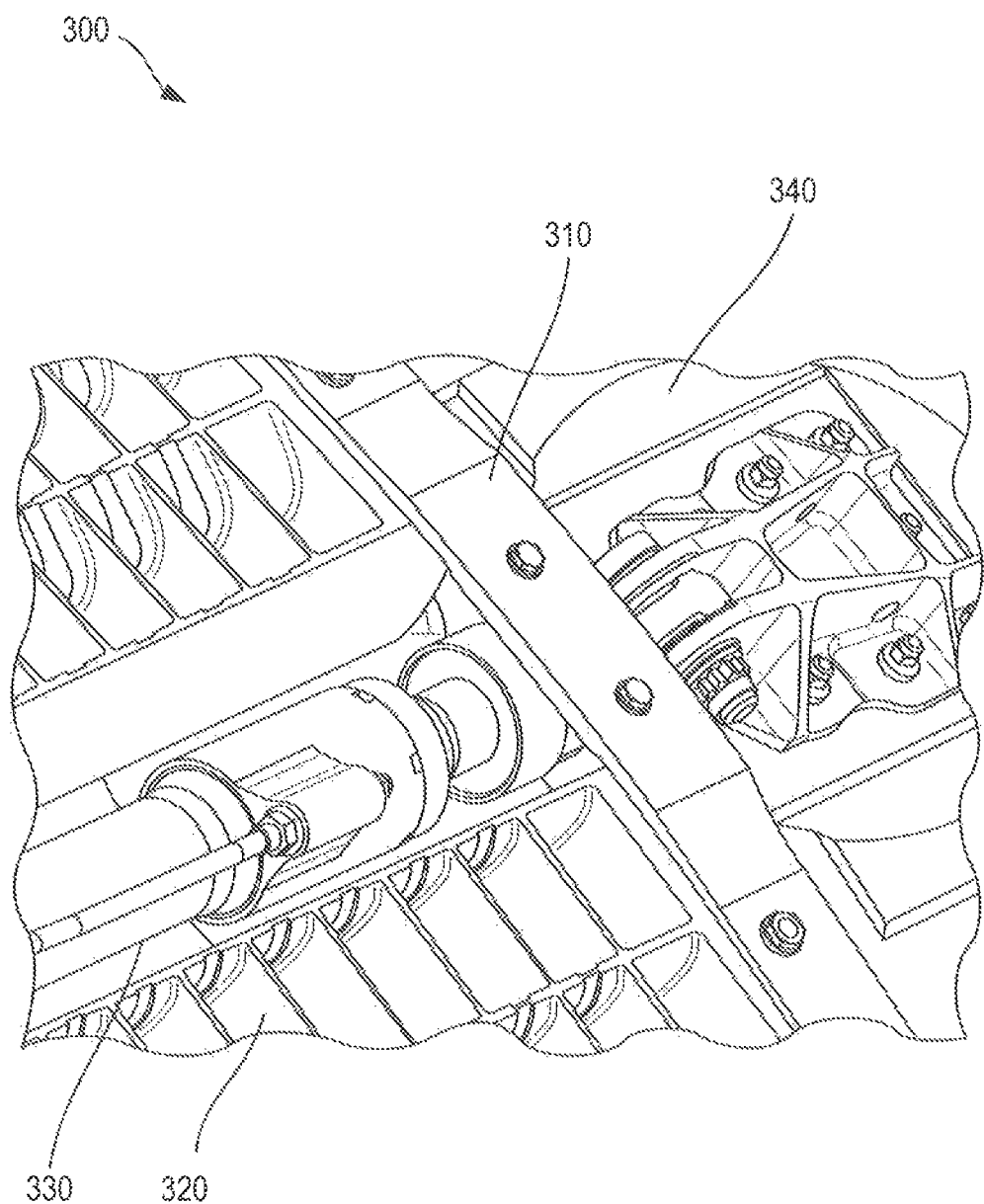
FIG. 3 illustrates a perspective view of a cascade assembly and actuator in accordance with various embodiments.

Referring to FIG. 3, a perspective view of a cascade assembly 300 within a thrust reverser is illustrated according to various embodiments. The cascade assembly 300 may comprise a fixed matrix of passages that are configured to direct air flow during a thrust reverse event. The aft cascade ring 310 may extend between a latch beam (not shown) at the bottom of one half of the thrust reverser and a hinge beam (not shown) at the top of one half of the thrust reverser and tie the separate cascade boxes 320 together and stiffen the cascade boxes 320 against outward deflection. A TRAS actuator 330 may drive the translating sleeve 340 forward and aft in order to activate the thrust reverser. The TRAS actuator 330 may comprise hydraulic fluid inside the TRAS actuator 330 which powers the TRAS actuator 330. However, in various embodiments, the TRAS actuator 330 may be electrically driven.

The TRAS actuator 330 may pass through the aft cascade ring 310. A retainer, bumper and damper may be positioned generally between the TRAS actuator 330 and the aft cascade ring 310.

Figure 4:
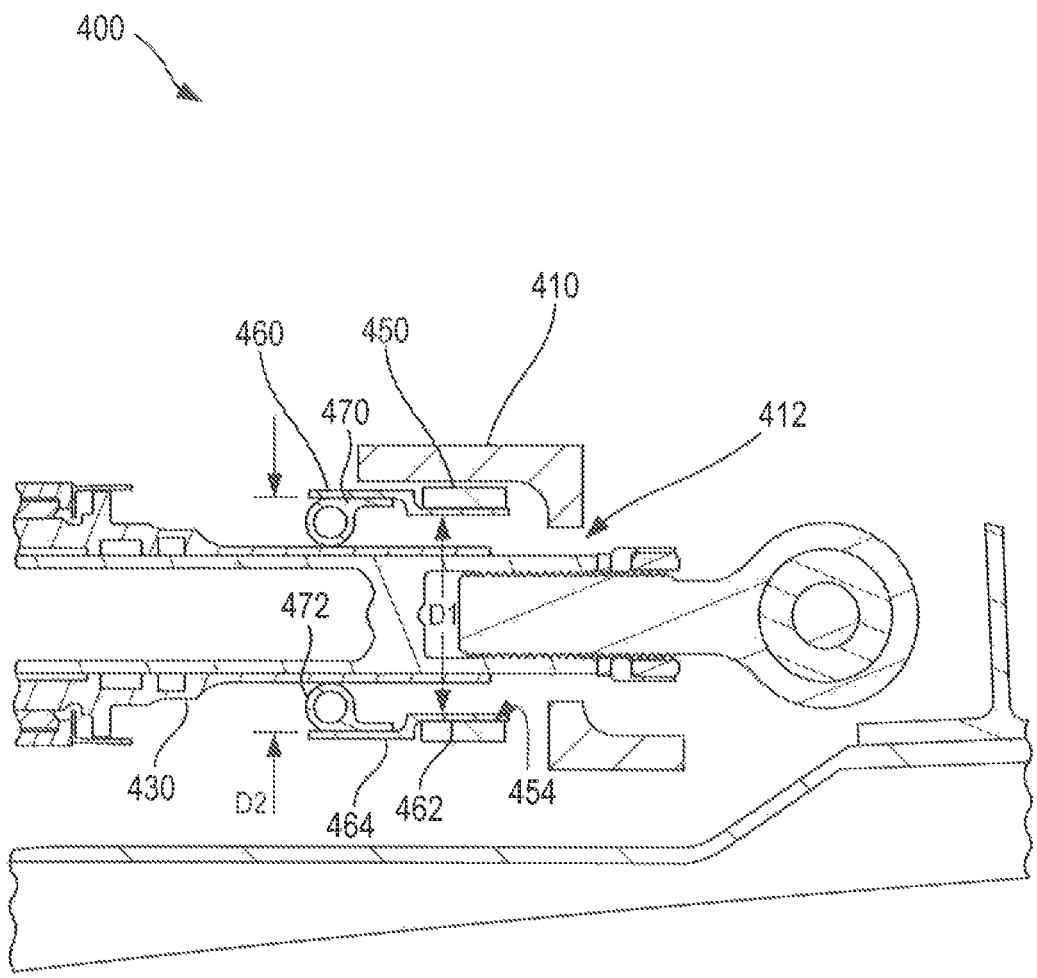
FIG. 4 illustrate a cross-section view of a cascade assembly with a damper having a bulb seal in accordance with various embodiments.

Referring to FIG. 4, a cross-section view of a cascade assembly 400 having a damper 470 is illustrated according to various embodiments. A retainer 450 may be coupled to the aft cascade ring 410. A bumper 460 may be coupled to an inner circumference 454 of the retainer 450. In various embodiments, the bumper 460 may be at least one of bonded, press fit, or bolted to the retainer 450. In various embodiments, the bumper 460 may be generally cylindrical. The bumper 460 may comprise a stepped profile, such that the bumper 460 comprises a first portion 462 having a first diameter D1, and a second portion 464 having a second diameter D2, wherein the second diameter D2 is greater than the first diameter D1. The second portion 464 may be located forward of the retainer 450. Thus, the second portion 464 may allow for a greater clearance between the second portion 464 and the TRAS actuator 430 as compared to the clearance between the retainer 450 and the TRAS actuator 430.

A damper 470 may be located between the second portion 464 of the bumper 460 and the TRAS actuator 430. The damper 470 may contact and circumscribe the TRAS actuator 430. In various embodiments, the damper 470 may contact the TRAS actuator 430. However, in various embodiments, a slight gap may be present between the damper 470 and the TRAS actuator 430. The damper 470 may comprise an elastomer (i.e. natural or synthetic rubber or silicone). In response to minor deflections of the TRAS actuator 430, the damper 470 may apply a small reaction force in the direction opposite the deflection. Thus, the damper 470 may damp small vibrations of the TRAS actuator 430 without applying a significant preload on the TRAS actuator 430. In response to larger deflections of the TRAS actuator 430, the damper 470 may compress and the reaction force may increase until the damper 470 "bottoms-out" or the TRAS actuator 430 contacts the bumper 460, at which point the TRAS actuator 430 is prevented from any further deflection. When the damper 470 "bottoms out," the reaction force of the damper 470 may increase to a large enough magnitude that the TRAS actuator 430 does not contact the bumper 460 under typical operating conditions. Thus, the damper 470 may prevent damage to the TRAS actuator 430 due to either small vibrations or contact with the bumper 460, aft cascade ring 410, or other rigid components.

In various embodiments, the damper 470 may comprise a bulb seal 472. However, the damper 470 may comprise any shape which compresses and generally increases the reaction force with increased compression. For example, referring temporarily to FIG. 5, a cascade assembly 500 may comprise a damper 570 with an open bulb seal 572, in which the damper 570 does not comprise a sealed tube. Additionally, although a bulb seal may be used, in various embodiments, the damper 570 does not form a seal with the TRAS actuator 530. Referring back to FIG. 4, the damper 470 may allow for a relatively small aperture 412 in the aft cascade ring 410, as well as damp small vibrations without applying a significant preload on the TRAS actuator 430. Additionally, the damper 470 may allow the TRAS actuator 430 to be removed by pulling the TRAS actuator 430 through the damper 470 during maintenance without removing the damper 470.

Figure 5:
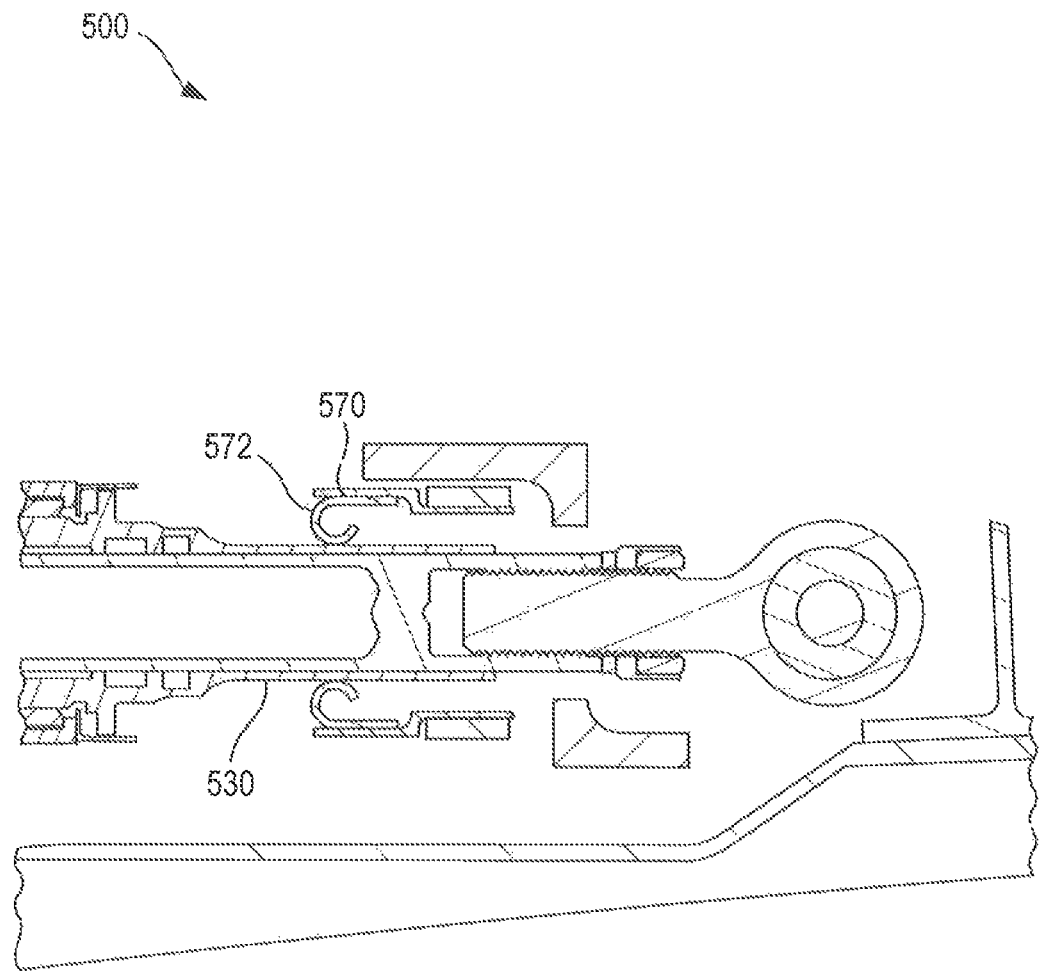
FIG. 5 illustrates a cross-section view of a cascade assembly with a damper having an open bulb seal in accordance with various embodiments.

In various embodiments, a damper may be located between the retainer 450 and the TRAS actuator 430. However, in many cases, there is not sufficient clearance for a flexible damper between the retainer 450 and the TRAS actuator 430. Thus, the damper may be located forward of the retainer 450, as shown in FIG. 4 and FIG. 5.

Figure 6:
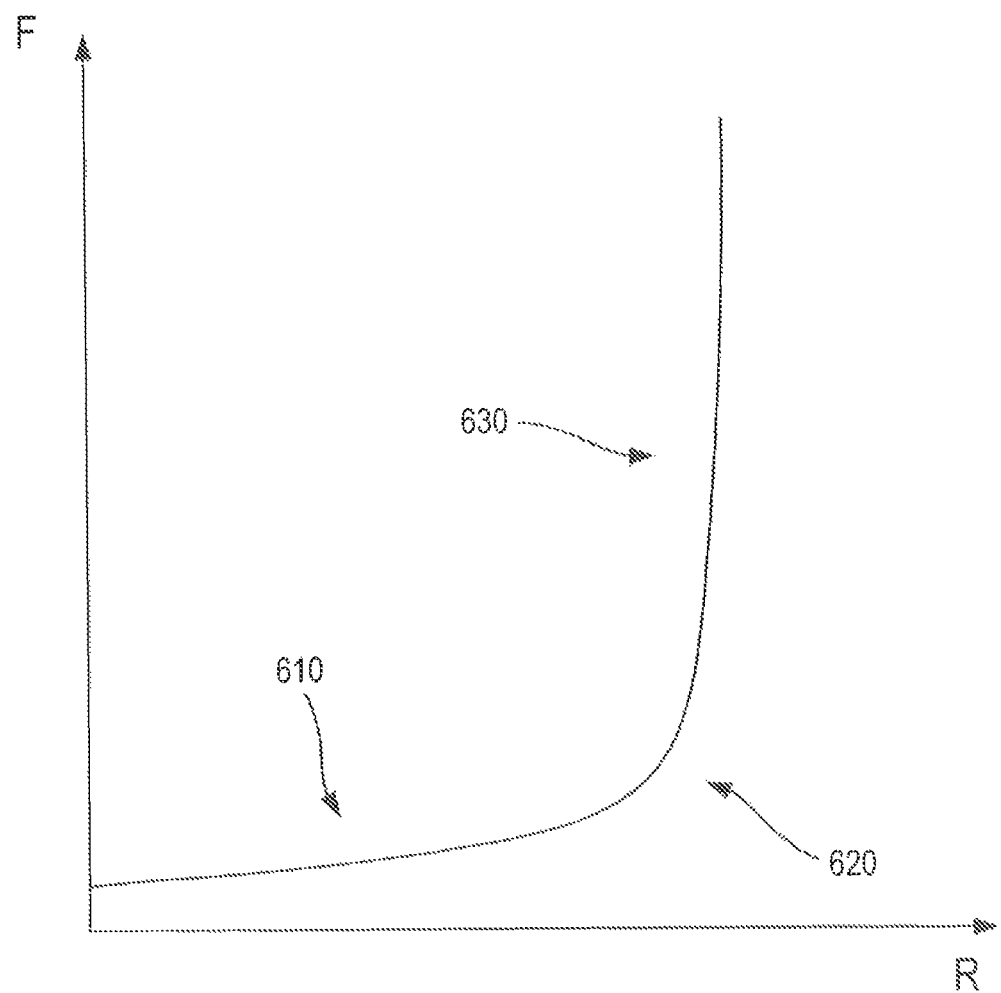
FIG. 6 illustrates a graph of resistance force versus radial displacement for a TRAS actuator in accordance with various embodiments.

Although specific shapes and materials for dampers have been disclosed herein, those skilled in the art will appreciate that any damper which provides a small reaction force at small deflections of a TRAS actuator and gradually increasing reaction forces at larger deflections are consistent with the present disclosure. For example, referring to FIG. 6, a graph of reaction force F versus radial displacement R is illustrated according to various embodiments. With small displacements of the TRAS actuator, the damper may compress and exert a gradually increasing reaction force of the TRAS actuator, shown in region 610. However, once the damper is fully compressed, the TRAS actuator bottoms out in region 620. The reaction force rapidly increases in region 630, until the TRAS actuator is prevented from further displacement. Thus, in region 610 the damper may damp vibrations in the TRAS actuator without applying a large reaction force on the TRAS actuator. However, the damper may also prevent large deflections of the TRAS actuator by applying a large reaction force when the damper bottoms out.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A thrust reverser assembly comprising:
   an aft cascade ring comprising an aperture;
   a thrust reverser actuation system ("TRAS") actuator extending through the aperture;
   a retainer coupled to the aft cascade ring;
   a damper coupled to the retainer, wherein the damper is in contact with the TRAS actuator, wherein the damper is configured to damp vibrations of the TRAS actuator; and
   a bumper located between the damper and the retainer.

2. The thrust reverser assembly of claim 1, wherein the bumper comprises a first portion having a first diameter, and a second portion comprising a second diameter, wherein the second diameter is larger than the first diameter.

3. The thrust reverser assembly of claim 2, wherein the damper is coupled to the second portion of the bumper.

4. The thrust reverser assembly of claim 2, wherein the first portion is located within the retainer, and wherein the second portion is located forward of the retainer.

5. The thrust reverser assembly of claim 1, wherein the damper comprises a bulb seal.

6. The thrust reverser assembly of claim 1, wherein the damper is configured to apply a reaction force to the TRAS actuator, such that the reaction force increases as an amplitude of deflection of the TRAS actuator increases.

7. The thrust reverser assembly of claim 1, wherein the damper comprises an elastomer.

8. A thrust reverser assembly for an aircraft comprising:
   a cascade comprising an aft cascade ring;
   a thrust reverser actuation system ("TRAS") actuator extending through the aft cascade ring;
   a flexible damper circumscribing the TRAS actuator, wherein the flexible damper is configured to exert a small reaction force on the TRAS actuator in response to a small deflection of the TRAS actuator, and wherein the flexible damper is configured to exert a large reaction force on the TRAS actuator in response to the flexible damper bottoming out; and
   a bumper coupled to the flexible damper, wherein the bumper is configured to prevent the TRAS actuator from contacting the aft cascade ring.

9. The thrust reverser assembly of claim 8, wherein the flexible damper is configured to damp vibrations in the TRAS actuator.

10. The thrust reverser assembly of claim 8, further comprising a retainer coupled to the aft cascade ring, wherein the retainer is coupled to the bumper.

11. The thrust reverser assembly of claim 8, wherein the flexible damper comprises an elastomer.

12. The thrust reverser assembly of claim 8, wherein the bumper comprises a first portion having a first diameter, and a second portion having a second diameter, wherein the second diameter is greater than the first diameter, and wherein the flexible damper is coupled to the second portion.

13. The thrust reverser assembly of claim 8, wherein the flexible damper is configured to exert a reaction force on the TRAS actuator which increases with an amplitude of a deflection of the TRAS actuator.

14. A thrust reverser assembly comprising:
   an aft cascade ring comprising an aperture;
   a thrust reverser actuation system ("TRAS") actuator extending through the aperture;
   a retainer coupled to the aft cascade ring; and
   a damper coupled to the retainer, wherein the damper is in contact with the TRAS actuator, wherein the damper is configured to damp vibrations of the TRAS actuator, wherein the damper comprises a bulb seal.

* * * * *